(12) United States Patent
Chen et al.

(10) Patent No.: US 9,885,814 B2
(45) Date of Patent: Feb. 6, 2018

(54) METHOD FOR MAKING COLOR IMAGE AND COLOR FILTER MANUFACTURED WITH THE METHOD

(75) Inventors: Linsen Chen, Jiangsu (CN); Yun Zhou, Jiangsu (CN); Yan Ye, Jiangsu (CN); Su Shen, Jiangsu (CN)

(73) Assignees: SOOCHOW UNIVERSITY, Jiangsu (CN); SVG OPTRONICS CO., LTD, Jiangsu (CN)

( * ) Notice: Subject to any disclaimer, the term of this patent is extended or adjusted under 35 U.S.C. 154(b) by 316 days.

(21) Appl. No.: 14/119,552

(22) PCT Filed: Sep. 21, 2011

(86) PCT No.: PCT/CN2011/079933
§ 371 (c)(1),
(2), (4) Date: Nov. 22, 2013

(87) PCT Pub. No.: WO2012/159397
PCT Pub. Date: Nov. 29, 2012

(65) Prior Publication Data
US 2014/0085727 A1    Mar. 27, 2014

(30) Foreign Application Priority Data
May 25, 2011  (CN) .......................... 2011 1 0136683

(51) Int. Cl.
*G02B 5/28*  (2006.01)
*G02B 5/20*  (2006.01)

(52) U.S. Cl.
CPC ............. *G02B 5/284* (2013.01); *G02B 5/201* (2013.01); *G02B 5/288* (2013.01)

(58) Field of Classification Search
CPC ........... G02B 5/201; G02B 5/284; G02B 5/20
(Continued)

(56) References Cited

U.S. PATENT DOCUMENTS

| 5,216,680 A | 6/1993 | Magnusson |
| 2004/0257541 A1 | 12/2004 | Lisaka |
| 2009/0231706 A1* | 9/2009 | Chen .................... G02B 5/1809 359/491.01 |

FOREIGN PATENT DOCUMENTS

| CN | 1573466 A | 2/2005 |
| CN | 1880980 | 12/2006 |

(Continued)

OTHER PUBLICATIONS

English Translation of the 1st Chinese Office Action dated May 6, 2014 for corresponding CN Application No. 201110136683.X.

*Primary Examiner* — Darryl J Collins
*Assistant Examiner* — Journey Sumlar
(74) *Attorney, Agent, or Firm* — Swanson & Bratschun, L.L.C.

(57) ABSTRACT

A method for making a color image and a color filter manufactured with the method. The color of the color image and the color of the color filter are characterized by resonance features of a Fabry-Perot resonant cavity (100). Through a nanoimprint technology, Fabry-Perot resonant cavities with different thicknesses are manufactured, and the Fabry-Perot resonant cavities with different thicknesses correspond to red, green and blue respectively. The red, green and blue Fabry-Perot resonant cavities are distributed according to the color separation principle, and a combination thereof has the effect of representing a whole image macroscopically.

8 Claims, 4 Drawing Sheets

(58) Field of Classification Search
USPC .......................... 264/17; 359/589; 72/342.7
See application file for complete search history.

(56) References Cited

FOREIGN PATENT DOCUMENTS

| | | | | |
|---|---|---|---|---|
| CN | 1942744 | 4/2007 | | |
| CN | 101063726 | 10/2007 | | |
| CN | 100442088 | 12/2008 | | |
| CN | 101752393 | 6/2010 | | |
| CN | 1854944 | 2/2011 | | |
| JP | 200328806 A | 10/2003 | | |
| JP | 2003287806 A | 10/2003 | | |
| WO | WO 95/17690 | 6/1995 | | |
| WO | WO 2008017490 A2 * | 2/2008 | ............. | B82Y 10/00 |

* cited by examiner

METHOD FOR MAKING COLOR IMAGE AND COLOR FILTER MANUFACTURED WITH THE METHOD

RELATED APPLICATIONS

This application is the national phase of International Application No. PCT/CN2011/079933, titled "METHOD FOR MAKING COLOR IMAGE AND COLOR FILTER MANUFACTURED WITH THE METHOD", filed on Sep. 21, 2011, which claims a priority to Chinese Patent Application No. 201110136683.X, filed with the State Intellectual Property Office of People's Republic of China on May 25, 2011, entitled as "METHOD FOR MAKING COLOR IMAGE AND COLOR FILTER MANUFACTURED WITH THE METHOD", which are incorporated herein by reference in their entirety.

TECHNICAL FIELD

The invention relates to image producing technologies, and in particular to a method for producing a colorful image and a color filter manufactured with the method.

BACKGROUND

Energy conservation and environmental protection is a basic national policy of China. 600,000 tones of printing ink (dye) are consumed by the printing industry per year in China. The printing ink is discharged into the nature and causes pollution for lack of effective treatment measures. Hence, it is emergent to reduce the conservation of the printing ink in the printing industry and to promote the innovation of green printing technologies.

A method for producing a colorful layer on the surface of a base material by using resonance characteristics of a Fabry-Perot resonant cavity is provided in the Chinese patent application No. CN200480042867. As shown in FIG. 1, the Fabry-Perot resonant cavity 100 includes: a total-reflective metallic layer 101, a transflective metallic layer 103, and a medium layer 102 provided between them. The resonance frequency of the whole Fabry-Perot resonant cavity may be in accordance with the frequency of specific light wave by adjusting the thickness of the medium layer 102. The specific light wave is absorbed through resonance and a colorful effect is produced on the surface. This patent application records the Fabry-Perot resonant cavity as only a monochromatic filter, but does not mention the production of colorful images or complicated colors. In addition, batch and low-cost production of colorful image are desirable for commercial production of ink-free printed products.

SUMMARY

Accordingly, a dye-free method for producing a colorful image is provided in the invention. Resonance characteristics of a Fabry-Perot resonant cavity are used in the method. Light with different colors may be reflected by manufacturing Fabry-Perot resonant cavities having different thicknesses and different resonance frequencies on the surface of a base material, hence, the colors are represented.

The method for producing the colorful image according to the invention mainly includes: making the Fabry-Perot resonant cavity on the surface of the base material, where a medium layer of the Fabry-Perot resonant cavity is made of thermoplastics; designing a metallic pressing film, where on the surface of the metallic pressing film, there are protuberances with at least two different heights, where the distribution of the protuberances corresponds to pixel points of the colorful image after digital division; performing hot embossing on the Fabry-Perot resonant cavity by using the metallic pressing film in order that the Fabry-Perot resonant cavity is embossed into a plurality of first Fabry-Perot resonant cavities each having a medium layer with a first thickness, a plurality of second Fabry-Perot resonant cavities each having a medium layer with a second thickness and a plurality of third Fabry-Perot resonant cavities each having a medium layer with a third thickness, where the resonance frequency of the first Fabry-Perot resonant cavities is in accordance with the frequency of red light wave, the resonance frequency of the second Fabry-Perot resonant cavities is in accordance with the frequency of green light wave and the resonance frequency of the third Fabry-Perot resonant cavities is in accordance with the frequency of blue light wave.

In the method of nano-imprinting, the image is represented into the pixel points and each pixel point is divided into three gray scale components: red, green and blue. Colorful images may be produced in batches if only the three thicknesses of the corresponding Fabry-Perot resonant cavities are calculated and the pressing film is designed and made. At the same time, a method of roll-to-roll nano-imprinting may be introduced to further improve the production efficiency.

In addition, a color filter manufactured with the method provided in the invention is given according an embodiment of the invention. The color filter is a reflective color filter, which includes a plurality of pixel points, and each pixel point includes three sub-pixels of red, green and blue. The color filter is manufactured with the method for producing the colorful image.

The color filter is designed based on a simple arrangement of the three primary colors; hence, the designed pressing film is relatively easy to make and a dye-free color filter may be truly produced commercially.

BRIEF DESCRIPTION OF THE DRAWINGS

Drawings used in embodiments or descriptions about the prior art are introduced briefly in the following in order to describe technical solutions according to the embodiments more clearly. Apparently, the drawings in the following descriptions are only corresponding to part of the embodiments of the invention, and other drawings may be obtained by those skilled in the art according to the embodiments without inventive efforts.

DETAILED DESCRIPTION

Technical solutions according to embodiments of the invention are described clearly and completely hereinafter in conjunction with drawings according to the embodiments. Apparently, the described embodiments are only part of the embodiments of the invention, rather than all the embodiments. Any other embodiment obtained by those skilled in the art based on the embodiments of the invention without inventive efforts shall fall in the scope of the invention.

Figure 1:
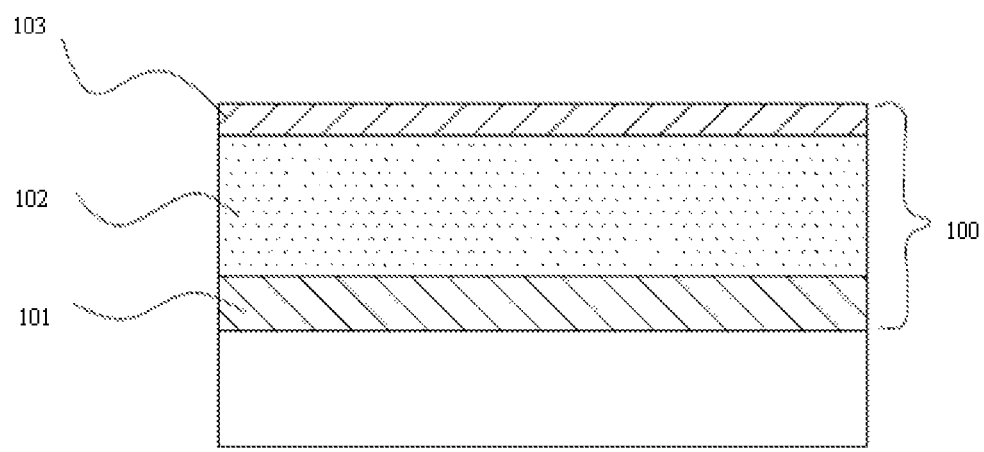
FIG. 1 illustrates an existing Fabry-Perot optical filter.
Figure 2:
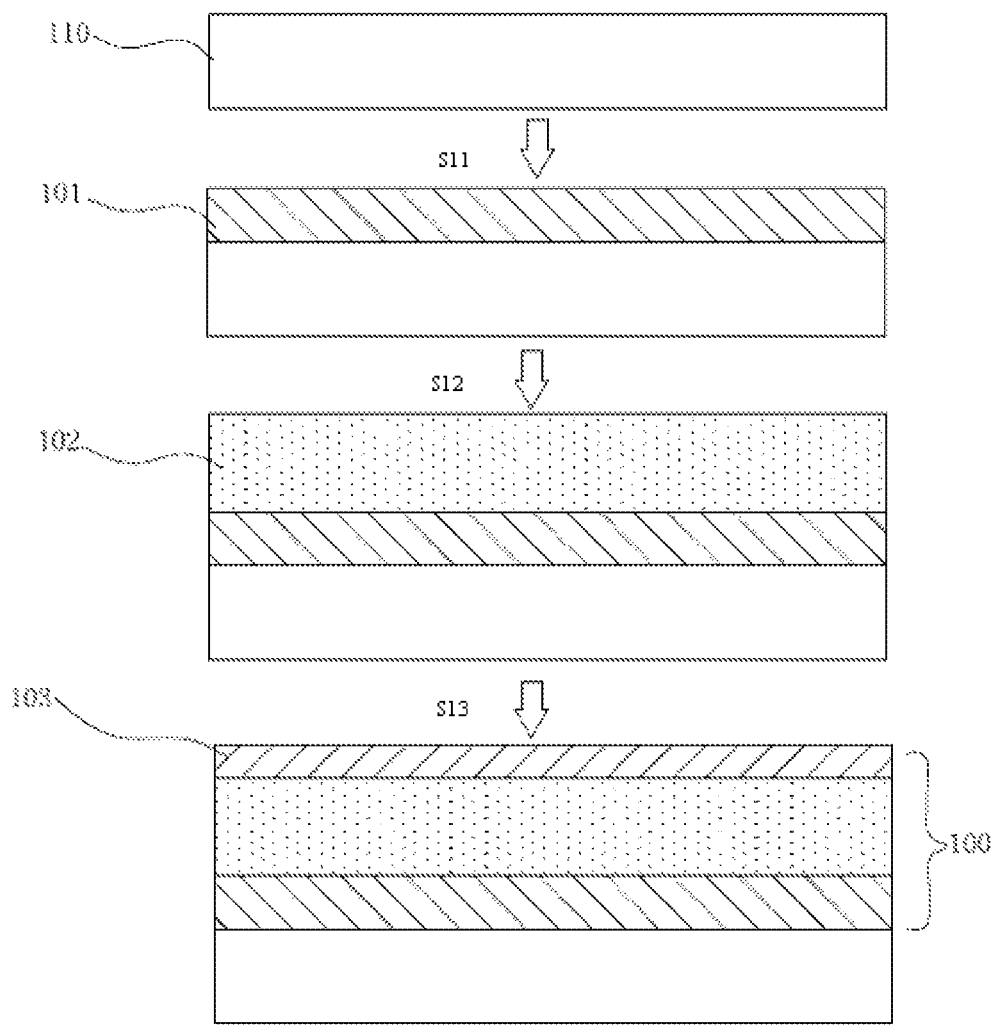
FIG. 2 is a flow chart of producing a Fabry-Perot resonant cavity according to the invention.

FIG. 2 is a flow chart of producing a Fabry-Perot resonant cavity according to the invention. As shown in FIG. 2, a first step is S11: evaporating a total-reflective metallic layer 101 on a base material layer 110. A next step is S12: coating a medium layer 102 on the total-reflective metallic layer 101. A final step is S13: evaporating a transflective metallic layer 103 on the medium layer 102. Hence, the Fabry-Perot resonant cavity 100 is produced.

The base material layer 110 is a transparent thin film, on which a release layer and an attaching layer may be attached in order that the Fabry-Perot resonant cavity 100 may be attached on an objective product. Alternatively, the base material layer 110 may be a transfer layer, which is removed after transferring the Fabry-Perot resonant cavity 100 to another material. Preferably, in the condition that the base material layer 110 is a flexible thin film, a roll-to-roll nano-imprinting process may be implemented in a following process of producing colors to increase the production efficiency.

The total-reflective metallic layer 101 is made of metal with high reflectivity, such as gold, silver, aluminum, copper, etc. The total-reflective metallic layer has a thickness from 25 nm to 40 nm.

The thickness of the medium layer 102 ranges from 100 nm to 550 nm. For a following imprinting process, the medium layer 102 may be preferably made of thermoplastics, e.g., polymethyl methacrylate (PMMA) etc.

The transflective metallic layer 103 may be made of nickel, chromium, tungsten, etc. The transflective metallic layer should not be made too thick for better transparency and the thickness ranges usually from 10 nm to 20 nm.

The overall thickness of the Fabry-Perot resonant cavity 100 is smaller than 600 nm, which is 1/15 to 1/10 of the thickness of an ordinary dye layer. Hence, materials are significantly saved and the influence on the nature is reduced.

It should be noted that, the materials and sizes in the invention are only based on some specific embodiments, and all other materials and sizes which may implement the Fabry-Perot resonant cavity according to the invention shall fall in the scope of the invention.

The resonance frequency of the Fabry-Perot resonant cavity is related to the thicknesses of the total-reflective metallic layer, the transflective metallic layer and the medium layer according to the resonance principle. Hence, different colors may be represented by changing the thickness of the medium layer with the unchanged thicknesses of the total-reflective metallic layer and the transflective metallic layer.

Figure 3:
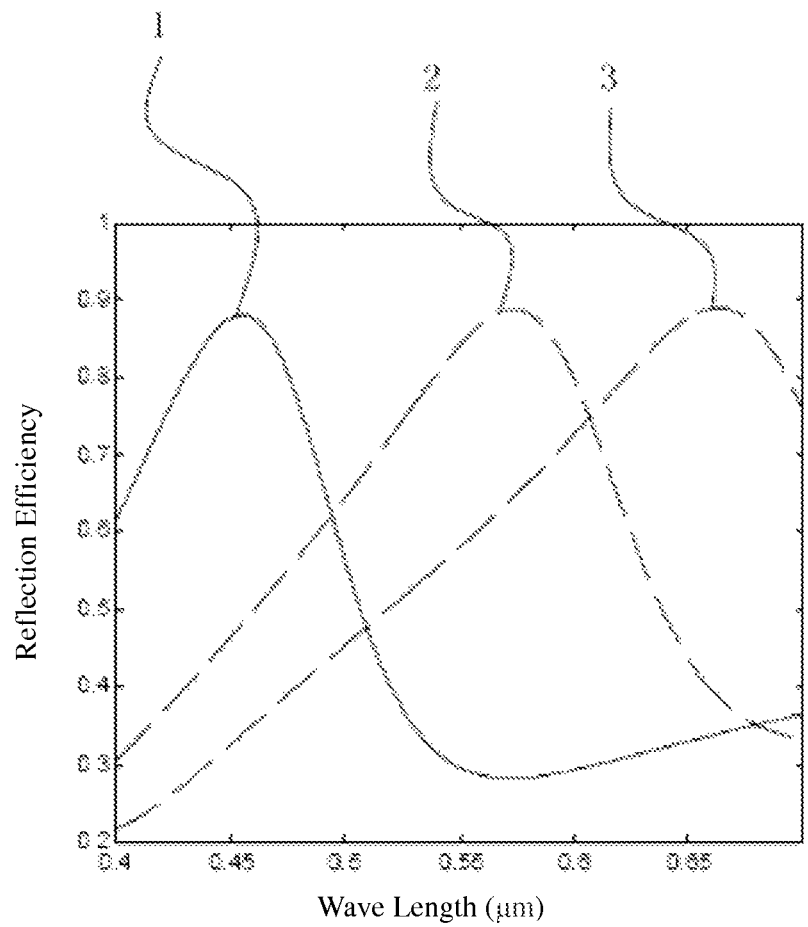
FIG. 3 is a reflective spectrogram corresponding to three different thicknesses of a medium layer according to the invention.

FIG. 3 is a reflective spectrogram corresponding to three different thicknesses of a medium layer according to the invention. As shown in FIG. 3, the thickness of the total-reflective metallic layer 101 is 50 nm and the thickness of the transflective layer 103 is 20 nm. In the condition that the thickness of the medium layer 102 is 130 nm, a reflection efficiency is illustrated in curve 1. It may be found in this condition, the reflection efficiency reaches a maximum in the case of about 450 nm wave length corresponding to blue light. In this case, the Fabry-Perot resonant cavity reflects blue light while filters light with other colors, and thus the blue light is represented.

In the condition that the thickness of the medium layer 102 is 170 nm, a reflection efficiency is illustrated in curve 2. It may be found in this condition, the reflection efficiency reaches a maximum in the case of about 570 nm wave length corresponding to green light. In this case, the Fabry-Perot resonant cavity reflects green light while filters light with other colors, and thus the green light is represented.

In the condition that the thickness of the medium layer 102 is 200 nm, a reflection efficiency is illustrated in curve 3. It may be found in this condition, the reflection efficiency reaches a maximum in the case of about 670 nm wave length corresponding to red light. In this case, the Fabry-Perot resonant cavity reflects red light while filters light with other colors, and thus the red light is represented.

Accordingly, a colorful image with a plurality of colors may be produced if only Fabry-Perot resonant cavities with different thicknesses may be integrated. How to produce the colorful image with the Fabry-Perot resonant cavities is given in the following.

It is known that, the colorful image may be divided into pixel points including three gray scales of red, green and blue with a digital color separation principle. The size of each pixel point ranges usually from several hundred nanometers to several hundred micrometers. Hence, the colorful image may be produced if only tiny Fabry-Perot resonant cavities with different thicknesses may be made in this range.

Figure 4:
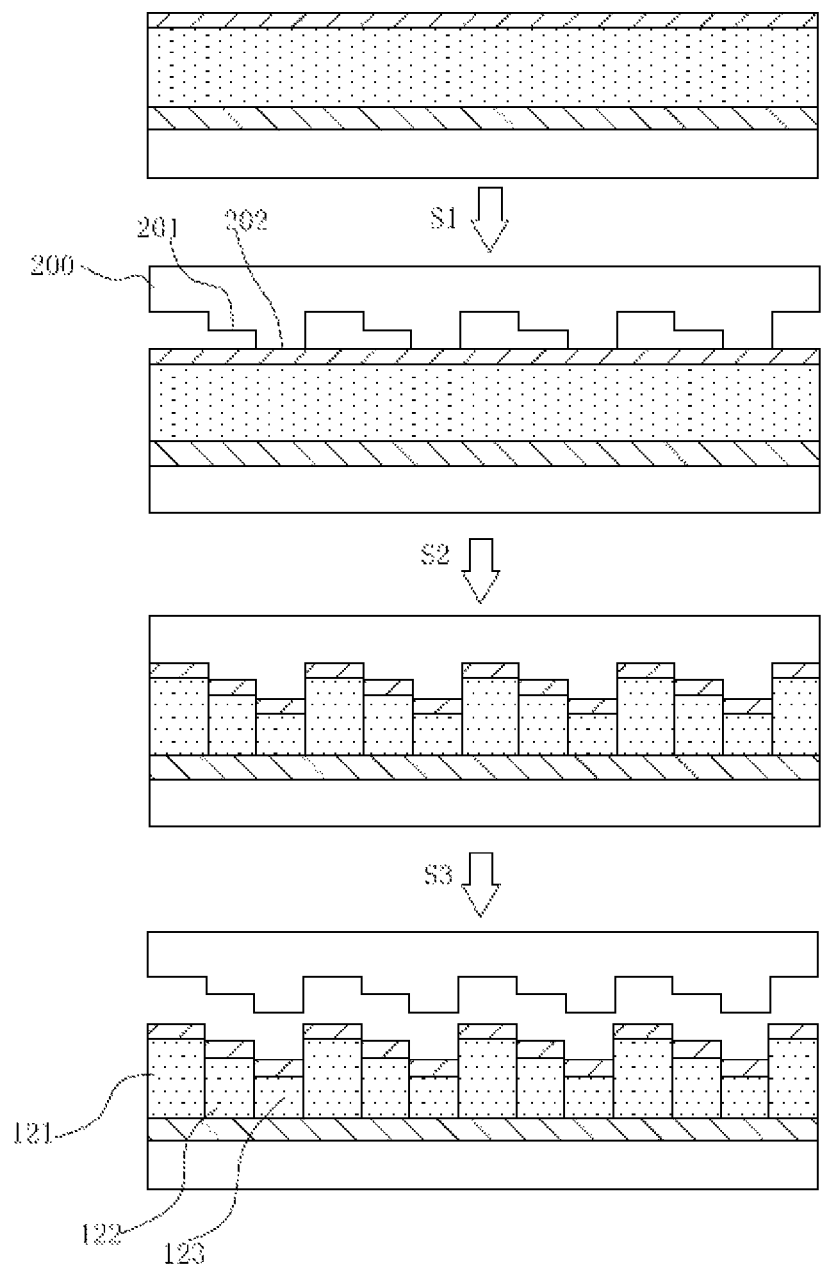
FIG. 4 is a schematic flow chart of producing a colorful image according to the invention.

FIG. 4 is a schematic flow chart of producing a colorful image according to the invention.

A first step is S1: manufacturing the whole Fabry-Perot resonant cavity.

A next step is S2: manufacturing a metallic pressing film. On the surface of the metallic pressing film, there are protuberances 201 and 202 with at least two different heights. The distribution and size of the protuberances correspond to pixel points of the colorful image after digital division. The protuberances may be made by photoetching and plating. The rigidity of the metallic pressing film is usually equal to or bigger than that of the transflective metallic layer, and a nickel film is used in the invention.

The last step is S3: performing hot embossing on the Fabry-Perot resonant cavity by using the metallic pressing film. During the hot embossing, the temperature ranges from 100 degree Celsius to 250 degree Celsius and the pressure ranges from 1 Mpa to 20 Mpa. The Fabry-Perot resonant cavity is embossed into a plurality of first Fabry-Perot resonant cavities 121 each having a medium layer with a first thickness, a plurality of second Fabry-Perot resonant cavities 122 each having a medium layer with a second thickness and a plurality of third Fabry-Perot resonant cavities 123 each having a medium layer with a third thickness. The resonance frequency of the first Fabry-Perot resonant cavities 121 is in accordance with the frequency of red light wave, the resonance frequency of the second Fabry-Perot resonant cavities 122 is in accordance with the frequency of green light wave, and the resonance frequency of the third Fabry-Perot resonant cavities 123 is in accordance with the frequency of blue light wave. The distribution of the tiny Fabry-Perot resonant cavities represents an effect of a whole image.

In a preferred specific embodiment, the metallic pressing film may be made on a roll, the imprinting process may be performed through a roll-to-roll nano-imprinting process cooperated with a flexible base material layer on another roll.

It should be noted that, not only the colorful image may be produced but also a reflective color filter in a display device may be fabricated.

Generally, the color filter includes a plurality of pixel points, and each pixel point includes three sub-pixels of red, green and blue. The red, green and blue sub-pixels are spaced in sequence. Hence, different protuberances on a metallic film are also arranged regularly, and the color filter is easier to make compared with the production of the colorful image. The color filter provided in the invention, of which the filtering principle is implemented through the resonance principle of a Fabry-Perot resonant cavity, has better purity of colors and environmental friendliness than an ordinary dye color filter.

Accordingly, in the method of nano-imprinting of the invention, tiny cavities with different resonance frequencies are made on the Fabry-Perot resonant cavity, each tiny cavity reflects one color, and then an overall effect of the colorful image is produced by a combination of the tiny cavities. The invention may also be used to manufacture the reflective color filter, in which the sub-pixels of red, green and blue of the color filter are represented by regularly arranging the Fabry-Perot resonant cavities corresponding to red, green and blue. In the colorful image and the color filter fabricated according to the invention, the colors are represented by using the resonance characteristics of the Fabry-Perot resonant cavity instead of dye, the pollution is significantly reduced, and an ink-free color printing is implemented.

The description of the embodiments is intended to describe the characteristics and spirit of the invention more clearly, rather than to limit the scope of claims of the invention; on the contrary, various changes and equivalent arrangements shall fall in the scope of the claims of the invention.

The invention claimed is:

1. A method for producing a colorful image, wherein colors of the colorful image are represented by a Fabry-Perot resonant cavity provided on the surface of a base material, wherein the method for producing the colorful image comprises:

step (1): evaporating a total-reflective metallic layer on the base material, coating a medium layer on the total-reflective metallic layer, and evaporating a transflective metallic layer on the medium layer, to form the Fabry-Perot resonant cavity, wherein the medium layer of the Fabry-Perot resonant cavity is made of thermoplastics;

step (2): designing a metallic pressing film, wherein on the surface of the metallic pressing film there are protuberances with at least two different heights, wherein the distribution of the protuberances corresponds to pixel points of the colorful image after digital division; and step (3): performing hot embossing from the surface of the transflective metallic layer away from the medium layer by using the metallic pressing film, to change the thickness of the medium layer to emboss the Fabry-Perot resonant cavity into a plurality of first Fabry-Perot resonant cavities each having the medium layer with a first thickness, a plurality of second Fabry-Perot resonant cavities each having the medium layer with a second thickness, and a plurality of third Fabry-Perot resonant cavities each having the medium layer with a third thickness, wherein the resonance frequency of the first Fabry-Perot resonant cavities is in accordance with the frequency of red light wave, the resonance frequency of the second Fabry-Perot resonant cavities is in accordance with the frequency of green light wave, and the resonance frequency of the third Fabry-Perot resonant cavities is in accordance with the frequency of blue light wave.

2. The method for producing the colorful image according to claim 1, wherein the thickness of the total-reflective metallic layer ranges from 25 nm to 40 nm, the thickness of the transflective metallic layer ranges from 10 nm to 20 nm and the thickness of the medium layer ranges from 100 nm to 550 nm.

3. The method for producing the colorful image according to claim 1, wherein the total-reflective metallic layer is made of aluminum, the transflective metallic layer is made of one of nickel, chromium and tungsten, and the medium layer is made of polymethyl methacrylate.

4. The method for producing the colorful image according to claim 1, wherein the digital division in the step (2) comprises: dividing the colorful image into a plurality of pixel points based on a color separation principle, wherein each pixel point comprises three gray scale components of red, green and blue.

5. The method for producing the colorful image according to claim 1, wherein the base material is a flexible thin film and the metallic pressing film is made on a roll, wherein the hot embossing in the step (3) is implemented through a roll-to-roll nano-imprinting process.

6. The method for producing the colorful image according to claim 1, wherein the rigidity of the transflective metallic layer is smaller than or equal to the rigidity of the metallic pressing film.

7. A color filter, wherein the color filter is a reflective color filter comprising a plurality of pixel points, wherein each pixel point comprises three sub-pixels of red, green and blue, wherein the color filter is manufactured with the method for producing the colorful image according to claim 1.

8. The color filter according to claim 7, wherein the red, green and blue sub-pixels are spaced in sequence.

* * * * *